Figure 1:
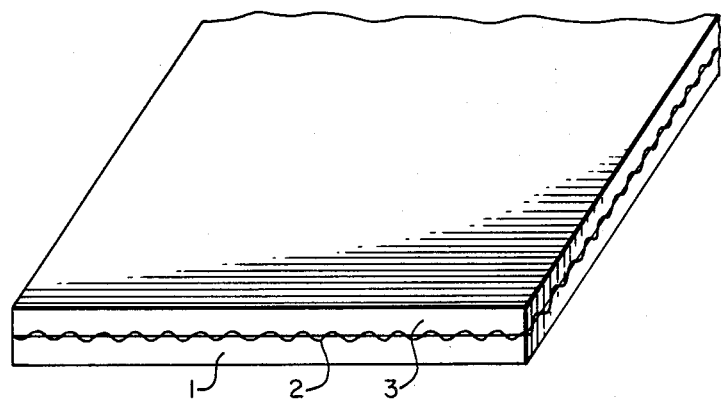

United States Patent [19]

Kuhnel et al.

[11] Patent Number: 4,511,619
[45] Date of Patent: Apr. 16, 1985

[54] SEALING SHEET OF ELASTOMERIC SYNTHETIC RESINS WITH TEXTILE REINFORCEMENT ON OUTER LAYER

[75] Inventors: Werner Kuhnel, Neunkirchen-Schoneshof; Peter Pütz, Augustin-Menden; Manfred Simm, Troisdorf; Paul Spielau, Troisdorf-Eschmar, all of Fed. Rep. of Germany

[73] Assignee: Dynamit Nobel AG, Troisdorf, Fed. Rep. of Germany

[21] Appl. No.: 640,488

[22] Filed: Aug. 13, 1984

Related U.S. Application Data

[63] Continuation of Ser. No. 475,520, Mar. 15, 1983, abandoned, which is a continuation-in-part of Ser. No. 421,400, Sep. 22, 1982, Pat. No. 4,435,466.

[30] Foreign Application Priority Data

Dec. 17, 1981 [DE] Fed. Rep. of Germany ....... 3150021

[51] Int. Cl.$^3$ .......................... B32B 5/08; B32B 17/04
[52] U.S. Cl. .................................. 428/215; 428/219; 428/247; 428/251; 428/252; 428/285; 428/286; 428/287; 428/340; 428/515; 428/516; 428/517; 428/519; 428/521
[58] Field of Search ............... 428/247, 251, 252, 285, 428/286, 287, 515, 516, 517, 519, 521, 215, 219, 340

[56] References Cited

U.S. PATENT DOCUMENTS 4,126,721 11/1978 Vitt ..................................... 428/247

Primary Examiner—Marion E. McCamish
Attorney, Agent, or Firm—Antonelli, Terry & Wands

[57] ABSTRACT

A sealing sheet for the building industry made up of at least one layer which contains an elastomeric synthetic resin that is devoid of, i.e., free of vulcanization accelerator, and that contains fillers, especially carbon admixed with an ethylene-propylene-diene terpolymer and/or ethylene-propylene copolymer and which has, on the outside and/or between layers of a synthetic resin, a reinforcing layer laminated in place with the use of heat and comprised of a fabric, a mat, a knitted material, a nonwoven material, or a similar material formed of a synthetic resin and/or of glass fibers.

14 Claims, 2 Drawing Figures

SEALING SHEET OF ELASTOMERIC SYNTHETIC RESINS WITH TEXTILE REINFORCEMENT ON OUTER LAYER

This is a continuation of application Ser. No. 475,520, filed Mar. 15, 1983 now abandoned, which is a C-I-P application of Ser. No. 421,400, filed 9/22/82, now U.S. Pat. No. 4,435,466, issued 3/6/84.

This invention relates to a sealing sheet for the building industry made up of at least one layer of elastomeric synthetic resin which is weldable thermally and/or by solvents or swelling agents, and which optionally contains customary additives, and a textile reinforcing layer, which textile layer is either embedded between two layers of the elastomeric synthetic resin and/or applied to the outside of one layer of the elastomeric synthetic resin.

Sealing sheets or films for the sealing of areas in above-ground, excavating, and civil engineering construction must exhibit a number of various properties to satisfy the posed requirements regarding leakproofness and weatherability. Among these properties are high mechanical strength and adequate elongation at room temperature as well as higher temperatures up to about 80° C., long-term stability against weathering, lightfastness and UV stability, ready bondability of the sheets with one another to form larger-area tarpaulins, and aging resistance, as well as biological resistance. Sealing sheets of a great variety of compositions have been known, based on thermoplastic synthetic resins or elastomeric, vulcanizable or vulcanized synthetic resins, or thermoplastic synthetic resins having elastomeric properties, but these, besides advantageous properties, have in all cases disadvantages as well. The conventional thermoplastic sealing sheets, for example, on the basis of plasticized polyvinyl chloride, polyisobutylene, acrylic polymers, or bitumen-modified thermoplastics can be tightly sealed along the seams in a simple and perfect fashion, but are sensitive to the effects of temperature. These drawbacks are sought to be counteracted by laminating woven fabrics or fleeces (mats) of textile fibers or glass fibers onto or into the sheets, but this method is only partially successful.

The conventional sealing sheets of vulcanizable synthetic resins, for example, on the basis of chloroprene elastomer, ethylene-propylene-diene terpolymers, chlorosulfonated polyethylene elastomer, or butyl elastomer, although meeting the requirements for mechanical strength and weatherability, exhibit the considerable drawback that the unvulcanized sheets do not satisfy the mechanical requirements at elevated temperatures and the vulcanized sealing sheets cannot be bonded together by welding, but rather can be joined only with difficulties with the use of adhesives or adhesive strips or the like in a permanently tight fashion, see for example, DOS (German Unexamined Laid-Open Application) 2,510,162 or DAS (German Published Application) 2,233,199.

In this connection, the sealing sheets based on thermoplastic synthetic resins with elastomeric properties occupy an intermediate position. In the sealing sheet, for example, according to DOS 2,621,825, the complete vulcanization is to take place only after laying at the building site and after establishing the seam bonds between the sealing sheets; however, there is the danger of premature completion of vulcanization, whereby then the simple production of welded seam bonds is, in turn, made impossible. In the sealing sheet according to DOS 2,219,147, in contrast thereto, an unvulcanized mixture of thermoplastic and elastomeric synthetic resins is utilized, but in this sheet the seam bonds can likewise be established only with the aid of additional adhesive strips.

Recently, the practice has been adopted of manufacturing also multi-ply sealing sheets of vulcanizable materials instead of the aforedescribed single-ply synthetic resin sealing sheets made up of one material and optionally provided with a reinforcing insert; in this case, the outer plies are not at all vulcanized, or are vulcanized only to such an extent that they can still be welded thermally and/or by means of solvents or solution welding agents, and at least one completely vulcanized ply is provided, see for example, Austrian Pat. No. 290,612 or DOS 2,628,741. However, one disadvantage herein is the dependency on the type and quantity of vulcanization accelerator employed as well as the instant of complete vulcanization.

The invention pursues the objective of providing a sealing sheet on the basis of elastomeric synthetic resins satisfying the above-posed requirements without exhibiting the disadvantages of the conventional sealing sheets. The invention starts with a sealing sheet for the building industry with at least one layer of elastomeric synthetic resin and optionally customary additives, constituting an outer ply of the sealing sheet and being weldable thermally and/or by solvents or swelling agents. According to the invention, the objective is attained for a sealing sheet by providing that each layer or ply which contains an elastomeric synthetic resin or resins is free of vulcanization accelerator and contains, as the elastomeric synthetic resin, ethylene-propylene-diene terpolymers (EPDM) and/or ethylene-propylene copolymers (EPM).

In an advantageous composition of the sealing sheet of this invention, the elastomeric synthetic resin layer contains the following:

35–46% by weight of EPDM or EPM or mixtures of EPDM and EPM

40–58% by weight of fillers, of these up to 50% by weight of carbon black

5–12% by weight of extenders

10–0.1% by weight of stabilizers and antiaging compounds

5–1.9% by weight of mold release agents and auxiliary processing media.

The sealing sheet of this invention with synthetic resins which, by the use of elastomers, are vulcanizable but have not been vulcanized; i.e., have remained non-crosslinked, exhibits the advantageous properties of such synthetic resins, such as weldability, weathering and aging stability, inter alia, in the outer plies and attains, by a special reinforcing insert, not only a high parting strength of the plies but, besides dimensional stability, also adequate tear strength and tensile strength at higher temperatures to 80° C. and more. Since no vulcanization accelerators are used, there are no storage problems, either, for sealing sheets not as yet installed, namely, the occurrence of an undesirable, gradual completion of vulcanization.

It has been found, surprisingly, that the thermoplastic mixtures selected according to this invention can be processed especially well by calendering and/or rolling into thick sheets, it being possible to manufacture homogeneous, void-free sheets of up to 2 mm in thickness. Advantageously, these thick sheets are merely laminated on one side with a textile reinforcing layer according to the invention. It is also possible to utilize an extruder for preliminary plasticizing, if such manufacture is effected by calendering.

The sealing sheet of this invention advantageously combines the benefits of the elastomeric, vulcanizable but not completely vulcanized synthetic resins, especially regarding weatherability, with the benefits of the thermoplastic synthetic resins; namely, weldability, especially also solution weldability.

The reinforced sealing sheet of this invention can be manufactured, for example, by calendering of sheeting, especially in the thicknesses from 0.6 to 0.9 mm, in accordance with the individual layers, and rolling or laminating these sheets together with the use of heat and pressure, while embedding the reinforcing insert therein. It is economical, in this connection, to employ the same sheeting for each of the outer layers of a sealing sheet housing two or more layers of the elastomeric synthetic resin.

In composing the outer layers of a multi-ply sealing sheet, it can also be advantageous to indicate the location of the reinforcement within the sealing sheet by appropriate coloring or, for example, surface embossing of an outer ply, or to mark that outer layer which, as the weathering side, is treated with or enriched in special stabilizers and/or UV absorbers or similar auxiliary agents.

According to a further development of the invention, all of the layers of the multi-ply sheet consist of an elastomeric synthetic resin based on ethylene-propylene-diene terpolymers (EPDM) or ethylene-propylene copolymers (EPM) or mixtures of EPDM and EPM.

In an advantageous composition of the sealing sheet of this invention, the synthetic resin layers contain fillers, preferably:
12–24% by weight of carbon black, reinforcing or semi-reinforcing types
26–31% by weight of silicic acid anhydride and or silica (silicic acid anhydride and kaolinite with a particle size smaller than 20 μm and at least 40% proportion of smaller than 2 μm),
based on 100% by weight of layer, for an economical manufacture of the sealing sheet, for improving the strength, and as a processing aid in the layers. (The carbon black is especially responsible for improving the strength.) The composition of this invention, surprisingly, provides good processability, especially suitability for calendering of the layers, and satisfies the requirements demanded of a sealing sheet with regard to mechanical properties, etc. The sealing sheet can advantageously also consist of merely one layer of the elastomeric synthetic resin in the form of a calendered sheet which is reinforced on at least one side with a textile or fibrous reinforcing layer.

The elastomeric synthetic resins selected are, in particular, partially crystalline ethylene-propylene terpolymers (EPDM) or partially crystalline ethylene-propylene copolymers (EPM) and/or mixtures thereof in order to ensure the high demands to be met by a sealing sheet with respect to mechanical properties, low-temperature stability, perforation strength even at higher temperatures, low shrinkage, tear strength, extensibility, and dimensional stability. An EPM is preferred with an ethylene content larger than 65% by weight and a propylene content smaller than 35% by weight, or an EPDM with an ethylene content larger than 65% by weight and a propylene content between 5 and 34% by weight and maximally up to 8% by weight of a diene component, preferably less than 5% by weight of a diene component. A suitable diene component is, for example, ethylidene norbornene. Other dienes suitable for this invention are hexadiene and cyclopentadiene. The minimum degree of partial crystallinity of the EPDM or EPM employed is determined according to the DSC method in a differential scanning calorimeter measuring the melting curve. The maximum of the melting peak, measured at temperature TS in °C. according to the DSC curve is designated as an endothermal peak which can be very narrow (defined) but can also encompass a range. With ethylene-propylene-diene terpolymers, the temperature TS is in the range around 50° C. The amount of heat required for melting, the so-called melting heat $\Delta H_s$, likewise measured according to the DSC method, then yields information on the presence of crystalline blocks in the ethylene-propylene-diene terpolymer or ethylene-propylene copolymer. Those partially crystalline EPDM or EPM elastomers with a melting heat of at least 10 J/g are preferably employed, according to this invention.

For selecting suitable elastomeric synthetic resins, especially EPDM and EPM, the strength thereof is likewise of importance, those EPDM and EPM being utilized according to the invention which exhibit a tear strength of at least 5 N/mm$^2$ measured according to DIN 53 455 (German Industrial Standard).

The high parting strength of at least 100 N/5 cm of the multi-ply sealing sheet of this invention is attained especially by choosing suitable reinforcing inserts with correspondingly large air interspaces between the warp and weft threads, making it possible for the synthetic resin layers to extend therethrough to an adequate degree and thereby to form an almost homogeneous bond. In this connection, glass fabrics are preferably employed, imparting to the multi-ply sealing sheet a high dimensional stability and diminishing the shrinkage, much feared in the building industry, under alternating temperature stresses during the course of summer/winter weathering.

An advantageous embodiment provides that the reinforcing layer laminated in between the layers of two elastomeric synthetic layers or on one side of a single layer with the aid of heat is a woven or non-woven fabric, a mat, a knitted fabric, or a similar material of synthetic resin fibers and/or glass fibers with a weight per unit area of 20–70 g/m$^2$, preferably 25–50 g/m$^2$, and with interstices of the fabric, mat, knitted fabric, or similar material between the warp and weft threads of at least 2.0 mm, preferably not more than 10 mm spacing, and that the multi-ply sealing sheet, due to the penetration of the elastomeric synthetic resin through the interstices or the fabric or the like, exhibits a separating strength of the layers larger than 100 N/5 cm.

Likewise of decisive importance is the selection of suitable fillers for the synthetic resin layers and additives which cooperate synergistically and which improve the properties of the sealing sheet, especially its mechanical characteristics. In this connection, an essential component is constituted by semiactive or active carbon blacks, so-called reinforcing blacks, wherein the layers contain preferably 12–24% by weight of carbon blacks. For example, suitable are carbon blacks produced according to the furnace method exhibiting average particle sizes of between 30 and 60 nm and a BET surface of between 30 and 60.

As reinforcing fillers and simultaneously for making the product less expensive, silica is preferably employed; i.e., a mixture of silicic acid anhydride and kaolinite, or only silicic acid anhydride, wherein the particle sizes should be smaller than 20 μm, and of these at least 40% should be smaller than 2 μm. However, it is also possible to replace up to ⅔ of the silica proportion by other fillers, likewise in a very fine-grained form, such as chalk, kaolin, talc, baryte and/or glass fibers, or mixtures thereof.

The filler carbon black improves the weatherability and mechanical strength of the product and the filler, especially silica and silicic acid anhydride improves the mechanical strength as elevated temperatures.

Additionally, the layers of the sealing sheet contain stabilizers and antiaging agents, especially on the basis of sterically hindered phenolic antioxidants, phenolic phosphites, thioesters of aliphatic carboxylic acids, and similar materials. Especially suitable as mold release agents for processing are metallic soaps, for example, calcium soaps, calcium stearate, zinc stearate, and as auxiliary processing agents especially montanic acid esters and/or hydrogenated hydrocarbon resins. Moreover, for processing EPDM and EPM, the use of extender oils on an aliphatic and/or naphthenic basis is required. A preferred structure for the synthetic resin layers according to the invention provides that they contain 35-46% by weight of EPDM and/or EPM, 31-26% by weight of fillers, such as chalk, kaolin, talc, baryte and/or glass fibers in mixtures with silica or solely silica or silica acid anhydride, 12-7% by weight of aliphatic and/or naphthenic extender oils, 1.0-0.1% by weight of stabilizers and antiaging agents on the basis of sterically hindered phenolic antioxidants, phenolic phosphites, thioesters of aliphatic carboxylic acids or the like, 25-19% by weight of reinforcing carbon blacks, 5.0-0.1% by weight of mold release agents on the basis of metallic soaps, 2.3-1.8% by weight of processing aids, such as montanic acid esters, hydrogenated hydrocarbon resins. Additionally, the sealing sheets can be provided with other customary additives, such as pigments for coloring and other materials.

An advantageous, economical embodiment of the sealing sheet of this invention has a reinforcing layer only on one outside surface, this layer being either a synthetic resin fiber mat with a weight per unit area of 10-300 g/m$^2$, especially 80-250 g/m$^2$ with a thickness of about 0.3-2 mm, especially 0.5-1.2 mm, or a glass fiber mat with a weight per unit area of 25-300 g/m$^2$, especially 70-150 g/m$^2$ with a thickness of 0.4-2 mm, especially 0.6-1.3 mm having a glass fiber diameter of 10-15 μm, which layer is firmly joined to the elastomeric layer by adhesion, for example by laminating. Suitable synthetic resin fiber mats are preferably nonwoven mats in particular, those based on polyester fibers, polyamide fibers and/or polyolefin fibers, such as polypropylene fibers. These mats can be reinforced thermally and/or chemically; in case of chemical strengthening, suitable binders include those on the basis of polyacrylates, polyvinyl acetates, polyvinyl propionate, in crosslinked or noncrosslinked form. The mats can be produced as spun mats, as carded mats based on short staple fibers which are needled and additionally thermoset and/or chemically bound. Moreover, so-called wet mats, which are not needled, can also be employed. It is also possible for the mats to contain, besides synthetic resin fibers, optionally minor amounts of other reinforcing fibers, such as carbon fibers or glass fibers, for example.

The glass mats selected for the outside reinforcing layers and used with preference are bound mats with a binder content of 5-40%, preferably 10-30%, the thinner mats exhibiting a higher binder content than the thicker mats. The binders are preferably chosen to be based on urea-formaldehyde resins, melamine-formaldehyde resins, acrylate resins, crosslinked and noncrosslinked, and/or vinyl acetate resins.

The mat can be applied to the sealing sheet preferably directly at the calender in an in-line operation, or later on by means of a doubling roller system. Advantageously, 4- or 5-roll calenders can be utilized for calendering the sealing sheet of this invention. With a direct lamination of the reinforcing layer, a 5-roll calender proves to be advantageous since it improves the adhesion between mat and sheet. Lamination of the mat in an in-line operation at the calender is preferably conducted at temperatures of 170°-220° C., but in any event below the melting temperature of the synthetic resin fibers in the mat. The pressure exercised during lamination in the roller gap lies preferably between 3 to 8 bar.

The properties of the sealing sheet of this invention are excellently adapted to all demands to be met in the building industry. Besides showing high performance at room temperature, the sealing sheet performs at low temperatures of down to −60° C. as well as at high temperatures up to about 80° C. Weathering stability and biological resistance are likewise present. Moreover, however, ready workability is provided, and the possibility is afforded of producing tight seam bonds by means of the simple solution welding or hot-air welding method which is popular and has proven itself well in the construction field.

It is known that the elastomeric, noncrosslinked or not completely vulcanized or superficially vulcanized synthetic resins and elastomers can be very readily heat-sealed by hot air or heated wedge and, consequently, good homogeneous seam bonds can be established. Such joining technique is desirable especially in the building industry when leakproof areas are produced with the use of sealing sheets, which must be bonded together into large sealing panels extending continuously over an area. Moreover, it is an object of the invention to provide a sealing sheet based on elastomeric synthetic resins which can also be bonded by the well-proven solution welding or cold welding method. The sealing sheet of this invention can be advantageously solution-welded with a solution welding agent on the basis of a mixture of toluene and petroleum spirits; in this process, it is possible to produce seam bonds of perfect quality at temperatures as low as about 0° C. in the open air at the building site.

Since the sealing sheets of the invention must withstand, when used for the construction field, relatively long transport paths, and storage even at higher temperatures, for example in the summertime, it is important that the rolled-up sealing sheets do not stick together. For this purpose, it is proposed according to the invention to powder, for example, the outer layers with a thin layer of talc or the like to avoid blocking of the layers during transport and storage in this way. It is also possible to utilize a parting film on the basis of polyolefins, for example a very thin polypropylene film of 30-100 μm, inserted between the individual layers of the rolled-up multi-ply sealing sheet. However, in this connection the problem arises that when laying the multi-ply sealing sheets at the building site, the parting film must be discarded as waste. The talc layer applied as the separating coat must be so thin that it does not impede the welding procedure, especially also the solution welding process.

Figure 2:
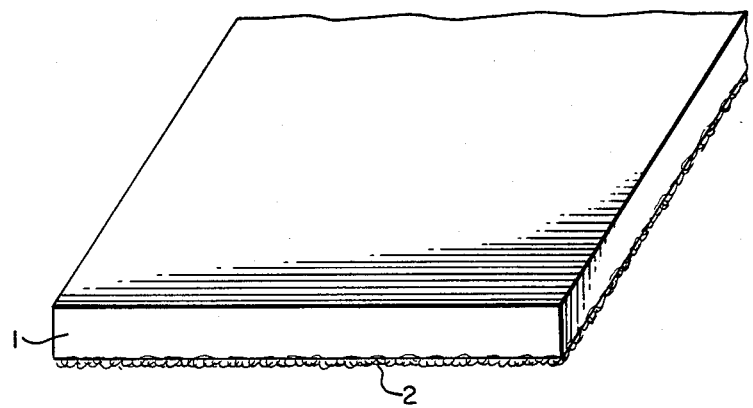

The drawings show in FIGS. 1 and 2 cross-sectional views of sealing sheets according to this invention.

FIG. 1 shows multi-ply sealing sheet with the two outer layers 1 and 3 based on EPDM and/or EPM without vulcanization accelerator and with the reinforcing insert 2, for example, a glass fabric having a weight per unit area of 40 g/m². The thickness of the individual layers 1, 3 lies preferably between 0.6 and 0.9 mm, so that the sealing sheet has a total thickness of between about 1.2 and 1.8 mm. However, thicker plies are definitely likewise suitable in an individual application, wherein the single layers 1, 3 can also exhibit varying thicknesses.

The reinforcing insert can also terminate within the layers 1, 3, so that a marginal zone free of reinforcement remains. The outer plies 1, 3 can also be treated differently with auxiliary compounds, for example, colorants, so that the top and bottom sides 1, 3 can be marked, providing a laying aid for the workman when installing the sealing sheet.

In the drawing, FIG. 2, a sealing sheet is schematically illustrated with a sheet 1 and a reinforcing layer 2 laminated to the underside of the sheet. The reinforcing layer 2 can also be narrower than the sheet and leave bare a marginal strip along the sheet of a width of about 5-10 cm for bonding by means of welding.

The following examples serve for explaining the invention without limiting same.

EXAMPLE 1

For obtaining the multi-ply sealing sheet according to FIG. 1, sheets having a thickness of 0.75 mm made up of a material composition A according to Table I are utilized for the outer layers 1, 3; and a glass fabric with a weight per unit area of 30 g/m² with a nonslip finish on the basis of vinyl propionate dispersion is used for the reinforcing insert 2; these layers are combined into the multi-ply sealing sheet for doubling as described hereinafter.

TABLE I

| Composition A | Parts by Weight |
|---|---|
| EPDM with 67% by weight ethylene 27% by weight propylene 6% by weight ethylidene norbornene $\Delta H_s$ 14 J/g, Tear strength 11.2 N/mm² | 40.0 |
| Sillitin (silica) | 27.0 |
| Extender oil (H 90 of Esso) | 8.0 |
| Hydrocarbon resin (Escorex 5300 of Esso) | 2.0 |
| Carbon black, semiactive | 22.5 |
| Calcium soap (Ceasit 1) | 0.3 |
| Antioxidants (Irganox 1070) | 0.2 |

The thus-produced multiple-layer sealing sheet has the following properties.

| | | |
|---|---|---|
| Thickness: | DIN 53370 | 1.5 mm |
| Tear strength: | DIN 53354 longitudinal/transverse, fabric | >400/>400 N/5 cm |
| Tear strength: | DIN 53354 longitudinal/transverse, sheet | >450/>450 N/5 cm |
| Elongation at rupture: | DIN 53354 longitudinal/transverse, fabric | 2/2% |
| Elongation at rupture: | DIN 53354 longitudinal/transverse, sheet | >450/>450% |
| Specific gravity: | DIN 53479 | 1270 kg/m³ |
| Parting strength of layers: | DIN 53357 | >100 N/5 cm |
| Dimensional change at +80° C., 6 hour period: | DIN 53377 | <0.5% |
| Cold impact strength: | VDCH 22-02 218 K | |

To weld the sealing sheets together with one another, the solution welding agent employed is, for example, a mixture of 1 part by volume of toluene and 3 parts by volume of petroleum spirits with a boiling range from 100° to ±40° C. Welding together of the sealing sheet of this invention with the aid of the solution welding agent according to this invention can be carried out at temperatures starting with 0° C. on upward, preferably at above 15° C.

In the process for the production of the multi-ply sealing sheet of this invention according to FIG. 1, a sheet having preferably a thickness of between 0.6 and 0.9 mm is calendered, in a first process step, from the elastomeric synthetic resin based on ethylene-propylene-diene terpolymers and/or ethylene-propylene copolymers. In this procedure, a premix of carbon black and EPDM or EPM, or alternatively, of EPDM plus EPM, is first of all produced, and this premix is then combined with the other additives, such as fillers, stabilizers, mold release agents, extenders, etc. The preparation of a premix of carbon black and elastomeric synthetic resin improves the mechanical properties of the resultant sheet. The mixing step is conducted either continuously in a screw-type masticator or, for example, discontinuously in an internal masticator; e.g., a floating weight internal masticator. The mixture is made to melt in the mixer at temperatures of 130°–220° C. The mixer yields a doughly, plasticized, not yet entirely homogenized mass which is then fed to a rough rolling mill for further intermixing and is further worked in this miss at temperatures of between 170° and 195° C. Subsequently, the batch is fed to a strainer, for example, and is here subjected to a final homogenizing step and filtered. When exiting from the strainer, the mass has a temperature of about 200°–220° C. The thus-prepared batch can now be introduced, into the actual calender; in this connection, L calenders as well as inverted-L calenders can be utilized. When the batch is fed to the roll nip of the calender, it has a temperature of between about 185° and 210° C., and when leaving the last calender roll, approximately still a temperature of about 170° C. The aforedescribed mode of operation is required to obtain a homogeneous, bubble-free product and is specifically adapted to the mixtures and molding compositions employed according to this invention for the production of the sealing sheets. Take-off speeds; i.e., production rates, at the calender of between 10 and 20 m/min are possible for the materials used in accordance with the invention and for the selected sheet thicknesses. Since the elastomeric mixtures employed tend to be extremely tacky, inasmuch as they soften above 100° and lose their mechanical strength, the preparation of the premix of carbon black and EPDM in particular is an essential step toward improving calendering ability.

Furthermore, a doubling or laminating system is required for the production of the multi-ply sheet. In this process, two calendered sheets of the same thickness; e.g., 0.75 mm, or of differing thicknesses, such as 0.5 and 0.8 mm, are conducted from two sides in preheated condition, for example, over heating rolls of a temperature of 100°–150° C. and/or are superficially heated by heat-radiating units on the side to be bonded to the glass fabric. The surface heating ranges approximately between 90° and 140° C. for the calendered sheets. Thereafter, both sheets are combined in a roll nip constituted by two laminating rolls, the glass fabric entering in the middle. However, it is also possible to join the glass fabric preliminarily with only one sheet first of all, and thereafter to add the second sheet by laminating. In the laminating nip, a pressure prevails of 3–5 bar. After lamination, the thus-produced multi-ply sheet runs optionally subsequently through a so-called embossing station wherein likewise again a pressure of 3–6 bar is applied in the roll nip. Then the multi-ply sheet is taken off, cooled, optionally powdered on its surface to prevent blocking, and rolled up.

It is also possible, for example, to fashion on of the two laminating rolls as an embossing roller, so that a separate embossing station can be omitted.

EXAMPLE 2

Mixture B described below is, as described in the preceding example for mixture A, mixed in a masticator, fed to the calender via roll and strainer, and rolled into a sheet of 1.2 mm.

TABLE II

| Composition B | Parts by Weight |
| --- | --- |
| EPDM with | 37 |
| 67% by weight ethylene | |
| 27% by weight propylene | |
| 6% by weight ethylidene norbornene | |
| $\Delta H_s$ 14 J/g | |
| Tear strength 11.2 N/mm$^2$ | |
| Sillitin (silica) | 23 |
| Silicic acid anhydride | 15 |
| Carbon black, semiactive | 15.4 |
| Extender oil (H90 from Esso) | 7 |
| Processing aids (Escorez) | 2 |
| Calcium soap (Ceasit 1) | 0.5 |
| Antioxidan (Irganox 1010) | 0.1 |

The following mats are fed into the last nip of the calender, obtaining a sealing sheet to which a mat is unilaterally laminated.

B 1: A spun mat of endless polyester fibers with a weight per unit area of 200 g/m$^2$. This mat is thermofixed. The mechanical properties can be seen from Table III below.

B 2: A needled spun mat of endless polyester fibers with a weight per unit area of 200 g/m$^2$. This mat was additionally thermofixed. The mechanical properties are set forth in Table III.

B 3: A needled mat produced on the carding machine from polyester staple fibers having a weight per unit area of 200 g/m$^2$. This mat was additionally thermofixed. See Table III for the mechanical properties.

B 4: A carded mat as in B 3, additionally containing 5% acrylate binder.

B 5: A mat of glass fibers having a diameter of 10 μm, with a weight per unit area of 100 g/m$^2$ and a binder content of 20% urea-formaldehyde resin. The mechanical properties are listed in Table III.

The unilaterally reinforced sealing sheets thus produced have the properties indicated in Table III below:

TABLE III

| | Exp. B 1 | Exp. B 2 | Exp. B 3 | Exp. B 4 | Exp. B 5 |
| --- | --- | --- | --- | --- | --- |
| Tear strength DIN 53354 Longitudinal, mat [N/5 cm] | 596 | 540 | 435 | 650 | 200 |
| Tear strength DIN 53354 Longitudinal, sheet [N/5 cm] | 475 | 475 | 510 | 745 | 400 |
| Elongation at rupture DIN 53354 Longitudinal, mat [%] | 27 | 76 | 260 | 140 | <3 |
| Elongation at rupture DIN 53354 Longitudinal, sheet [%] | 354 | 305 | 430 | 260 | 300 |
| Dimensional change DIN 53377 +80° C. after 6 hours [%] | <1 | <1 | <1 | <1 | <1 |
| Cold impact strength VDCH 22-02 [K] | 218 | 218 | 218 | 218 | 218 |

What is claimed is:

1. A multi-layered sealing sheet for the building industry comprising at least one outer layer containing elastomeric synthetic resin, which is weldable thermally and/or by solvents or swelling agents, and a textile reinforcing layer bonded to said at least one outer layer by thermal welding, said reinforcing layer being applied to the outside surface of said at least one outer layer of an elastomeric synthetic resin, all of the layers of said sheet containing elastomeric synthetic resin being free of vulcanization accelerator, and containing synthetic resin consisting essentially of an ethylene-propylene-diene terpolymer and/or an ethylene-propylene copolymer and said textile reinforcing layer being formed of synthetic resin fibers and/or glass fibers, having a weight per unit area of 10 to 300 g/m$^2$, and having interstices into which the heated elastomeric synthetic resin penetrates during said thermal welding to provide a bond exhibiting a parting strength which is larger than 100 N/5 cm.

2. The sealing sheet according to claim 1, wherein the at least one layer containing the elastomeric synthetic resin has a composition comprising:
   35–46% by weight of an ethylene-propylene-diene terpolymer, an ethylene-propylene copolymer, or a mixture of the terpolymer and the copolymer;
   40–58% by weight of filler of which up to 50% by weight is carbon black;
   5–12% by weight of extenders or similar materials;
   0.1–10% by weight of stabilizers and antiaging compounds; and
   1.9–5% by weight of mold release agents and auxiliary processing media.

3. The sealing sheet according to claim 1, wherein elastomeric synthetic resin-containing layer contains, as the fillers:
   12–24% by weight of carbon black; and
   26–31% by weight of silicic acid anhydride and/or silica (silicic acid anhydride and kaolinite with a particle size smaller than 20 μm and at least 40% smaller than 2 μm), based on 100% by weight of layer.

4. The sealing sheet according to claim 1, wherein the layers of elastomeric synthetic resin contain:
   35–46% by weight of ethylene-propylene-diene terpolymer and/or ethylene-propylene copolymer;
   26–31% by weight of at least one filler, comprising chalk, kaolin, talc, baryte and/or glass fibers in mixtures with silica, or only silica, or silicic acid anhydride, respectively;
   7–12% by weight of aliphatic and/or naphthenic extender oils;

0.1–1.0% by weight of stabilizers and antiaging compounds, comprising sterically hindered phenolic antioxidants, phenolic phosphites, thioesters of aliphatic carboxylic acids;

12–24% by weight of reinforcing carbon black types;

0.1–2.0% by weight of mold release agents comprising metallic soaps;

1.8–2.3% by weight of processing aids, comprising acid esters and hydrogenated hydrocarbon resins.

5. A sealing sheet according to claim 1, wherein said elastomeric synthetic, resin consist essentially of an ethylene-propylene copolymer containing at least 65% by weight of ethylene and maximum 35% by weight of propylene or an ethylene-propylene-diene terpolymer containing at least 65% by weight of ethylene, 5 to 34% by weight of propylene, and to 8% by weight of a diene component, preferably less than 5% by weight of a diene component.

6. A sealing sheet according to claim 5, wherein the ethylene-propylene-diene terpolymer contains ethylidene norbornene as the diene component.

7. A sealing sheet according to claim 1, wherein the ethylene-propylene-diene terpolymer, the ethylene-propylene copolymer or mixtures thereof are partially crystalline and exhibit a melting heat in accordance with DSC of at least $\Delta H_s = 10$ J/g.

8. A sealing sheet according to claim 1, wherein the elastomeric synthetic resin exhibits a tear strength of at least 5 N/mm$^2$.

9. A sealing sheet according to claim 1, wherein two calendered layers of the elastomeric synthetic resin having a thickness of 0.6–0.9 mm are laminated together under pressure and heat and then one of the calendered layers is laminated to the reinforcing layer.

10. A sealing sheet according to claim 1, wherein the reinforcing layer is a fabric, a mat, a knitted material, or a similar material of synthetic resin fibers and/or glass fibers having a weight per unit area of 20–70 g/m$^2$ and with interstices in the fabric, mat, knitted material, or the like, between the warp and weft threads having at least 2.0 mm spacing.

11. A sealing sheet according to claim 1, wherein as the outside reinforcing layer, a synthetic resin fiber mat having a weight per unit area of 80–250 g/m$^2$ and a thickness of 0.3–2 mm, is thermally bonded to elastomeric synthetic resin-containing layer.

12. A sealing sheet according to claim 1, wherein as an outside reinforcing layer, a glass fiber may having a weight per unit area of 70–150 g/m$^2$ and a thickness of 0.4–2 mm with a glass fiber diameter of 10–15 $\mu$m, is thermally bonded to the elastomeric synthetic resin-containing layer.

13. A sealing sheet according to claim 1, wherein reinforcing layer comprises a non-woven mat that is formed of randomly arranged fibers and that has interstices into which the heated elastomeric synthetic resin penetrates from one side of the layer to provide a tear strength of at least 400 N/5 cm.

14. A sealing sheet according to claim 13, wherein the mat is thermofixed prior to being bonded to the elastomeric synthetic resin by being thermally welded.

* * * * *